W. E. Worthen,
Faucet.
N° 35,054. Patented Apr. 22, 1862.
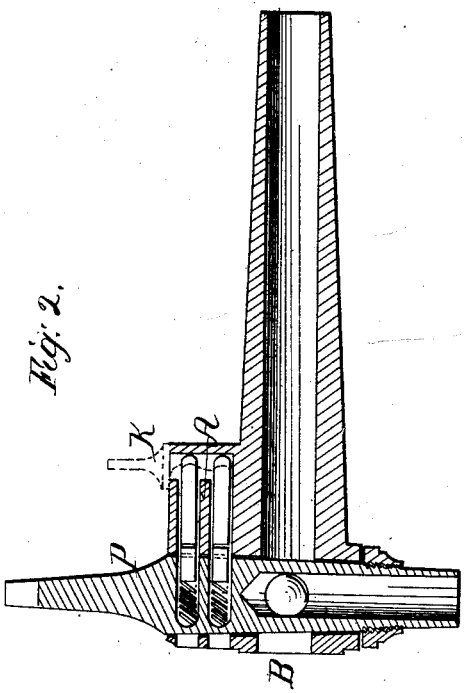
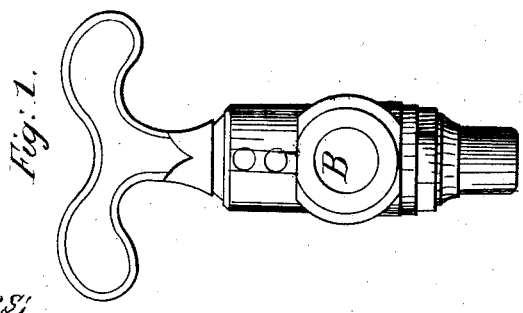
Witnesses:
C. Dietrich
E. P. Leonard
Inventor:
W E Worthen

UNITED STATES PATENT OFFICE.

WILLIAM E. WORTHEN, OF NEW YORK, N. Y.

FAUCET.

Specification of Letters Patent No. 35,054, dated April 22, 1862.

*To all whom it may concern:*

Be it known that I, WILLIAM E. WORTHEN, of the city, county, and State of New York, have invented a new and Improved Faucet, and that the following, taken in connection with the drawings, is a full, clear, and exact description thereof.

Figure 1 is an end view and Fig. 2 a longitudinal section through the faucet.

This faucet is of that variety which is to be driven into a cask or other receptacle of fluid and is provided with a hollow plug, the liquid when the faucet is open flowing through the bore of the faucet itself and thence through and out of the cavity or bore of the plug.

My first improvement is applicable to this and other varieties of faucets. My second improvement relates to this kind of faucet only.

My first improvement consists in the combination with the plug of the faucet of a pin or piston lock A, and by reference to the drawings it will be perceived that the pistons and their drivers lie in lines perpendicular to the line passing through the center of the plug and that the pistons take into the periphery of the plug. These pistons and their drivers are to be constructed as usual in piston locks and are to be acted upon by a key $k$, whose operation is indicated by dotted lines. By arranging the pistons and drivers as described and shown, and by making the plug itself to serve the purpose of the cylinder of an ordinary variety of piston lock, a lock faucet is made in a simple and cheap manner, and is not liable to get out of order.

My second improvement, as before stated, is in plug faucets only and only in that variety thereof in which the fluid passes first through the bore of the faucet and then at right angles to its former course or nearly so through the plug. Such faucets as now constructed have a solid head or in other words have no bore through that part thereof extending from the plug toward the end of the faucet. Such boring is as far as the action of the faucet is concerned unnecessary. Such faucets are however subjected to violent blows in driving them into casks and these blows tend to make the bore for the plug oval and thus make the faucet leak. I have discovered that this change of form can be diminished if not wholly prevented by removing the metal B at the head of the faucet or by casting the faucet with a cavity in the head substantially as shown in the drawings. When the head is thus made hollow the blow is taken upon the metal that lies outside of or surrounds the acting part of the plug, and in order to produce the best effect the cavity in the head should be equal in diameter to the plug; but I have found by experiment that a cavity of the proportions shown in the drawings produces a very good effect, and that such a faucet may be driven repeatedly into casks without practically effecting the shape of the plug seat.

In ordinary stop cocks made to secure in pipes I know that it is customary to bore through the cock chamber, but such stop cocks are not meant to be driven into casks and are not so constructed as to permit fluid to flow out through the plug itself and in them the plug has no bore in the line of its axis, for liquid to flow through and out of as in the faucet shown in the drawings.

I do not claim simply a hole through a faucet, on both sides of the plug thereof, but I do claim as of my own invention 1. The combination with the plug of a faucet of locking pistons, vibrating in lines perpendicular to the plug, the combination being substantially as specified and the pistons being arranged on the faucet as set forth.

2. The omission or cutting away of the metal at the head of a faucet which is provided with a plug so bored as described that liquid shall pass through the bore of the faucet and then through and out of the plug at right angles or nearly so to its former course, such omission or cutting away of the metal to be substantially to the extent and for the purpose described and the faucet being so constructed that liquid does not pass through the cavity formed by the omission or cutting away of the metal.

In testimony whereof I have hereunto subscribed my name in the city of New York on this 12th day of March A. D. 1861.

W. E. WORTHEN.

Witnesses:
C. DIETRICH,
E. P. LEONARD.